United States Patent [19]
Tagawa et al.

[11] Patent Number: 5,390,565
[45] Date of Patent: Feb. 21, 1995

[54] BICYCLE SPEED CHANGE SYSTEM, BICYCLE SPEED CHANGE METHOD AND BICYCLE SPEED CHANGE OPERATION ASSEMBLY

[75] Inventors: Koichi Tagawa; Yoshihisa Iwasaki, both of Osaka, Japan

[73] Assignees: Maeda Industries, Ltd., Osaka; Bridgestone Cycle Co., Ltd., Tokyo, both of Japan

[21] Appl. No.: 197,831

[22] Filed: Feb. 17, 1994

Related U.S. Application Data

[63] Continuation of Ser. No. 84,281, Jul. 8, 1993.

[30] Foreign Application Priority Data

Nov. 11, 1991 [JP] Japan .................. 3-294667

[51] Int. Cl.$^6$ .................. F16C 1/10; G05G 11/00
[52] U.S. Cl. .................. 74/502.2; 74/489; 474/80
[58] Field of Search ........... 74/489, 502.2, 475, 74/523; 474/80

[56] References Cited

U.S. PATENT DOCUMENTS

| | | | |
|---|---|---|---|
| 3,218,879 | 11/1965 | Reed .................. | 74/489 |
| 3,856,123 | 12/1974 | Kinsey .................. | 74/489 |
| 4,352,303 | 10/1982 | Christner .................. | 74/489 |
| 4,653,613 | 3/1987 | Blancas .................. | 74/489 |
| 5,009,629 | 4/1991 | Tagawa .................. | 74/537 X |
| 5,052,242 | 10/1991 | Look .................. | 74/502.2 |
| 5,102,372 | 4/1992 | Patterson .................. | 474/80 |
| 5,197,927 | 3/1993 | Patterson .................. | 474/80 |
| 5,303,608 | 4/1994 | Iwasaki .................. | 74/502.2 |

FOREIGN PATENT DOCUMENTS

| | | | |
|---|---|---|---|
| 507737 | 12/1951 | Belgium .................. | 74/489 |
| 0371429 | 6/1990 | European Pat. Off. .......... | 74/502.2 |
| 0423779 | 4/1991 | European Pat. Off. .......... | 74/502.2 |
| 0485863A1 | 5/1992 | European Pat. Off. .......... | 74/489 |
| 0523257A1 | 9/1992 | European Pat. Off. .......... | 74/489 |
| 2285655 | 4/1976 | France .................. | 74/502.2 |
| 2563174 | 10/1985 | France .................. | 74/489 |
| 3657062 | 7/1991 | France .................. | 74/489 |
| 540737 | 12/1931 | Germany .................. | 74/489 |
| 2710391 | 9/1978 | Germany .................. | 74/489 |
| 3215426A1 | 10/1983 | Germany .................. | 74/489 |
| 8536537 | 3/1986 | Germany .................. | 74/489 |
| 9015515 | 3/1991 | Germany . | |
| 410248 | 9/1943 | Italy .................. | 74/489 |
| 44-18334 | 8/1969 | Japan .................. | 74/502.2 |
| 44-26571 | 11/1969 | Japan .................. | 74/502.2 |
| 48-2600 | 1/1973 | Japan .................. | 74/489 |
| 48-33174 | 10/1973 | Japan .................. | 74/502.2 |
| 58-46693 | 3/1983 | Japan .................. | 74/489 |
| 58-191682 | 11/1983 | Japan .................. | 74/489 |
| 63-251388 | 10/1988 | Japan . | |
| 3-176290 | 7/1991 | Japan .................. | 74/489 |
| 4-321483 | 11/1992 | Japan .................. | 74/502.2 |
| 750478 | 6/1956 | United Kingdom .......... | 74/489 |
| 857008 | 12/1960 | United Kingdom .......... | 74/502.2 |
| 891512 | 3/1962 | United Kingdom .......... | 74/502.2 |
| 1004357 | 9/1965 | United Kingdom .......... | 74/489 |
| WO9214645 | 9/1992 | WIPO .................. | 74/489 |

*Primary Examiner*—Vinh T. Luong
*Attorney, Agent, or Firm*—Michael D. Bednarek

[57] ABSTRACT

The following technical measure is taken to provide a bicycle speed change system or method wherein a speed change operation can be performed substantially without unhanding a handlebar and without erroneously shifting to a lower or higher speed.

Specifically, the bicycle speed change system (1) comprises a front speed shifter (1a), a rear speed shifter (1b), and speed change operation assemblies respectively including cylindrical operation members (4a, 4b) rotatably supported around right and left grip portions (3a, 3b), respectively, of a handlebar (2); each of the shifters being operated by a control cable (T) which is pulled or released by rotating a corresponding one of the cylindrical operation members, wherein each of the cylindrical operation members (4a, 4b) is designed so that rotation thereof in a direction of moving its top surface rearward causes a corresponding one of the shifters (1a, 1b) to shift to a lower speed position.

4 Claims, 9 Drawing Sheets

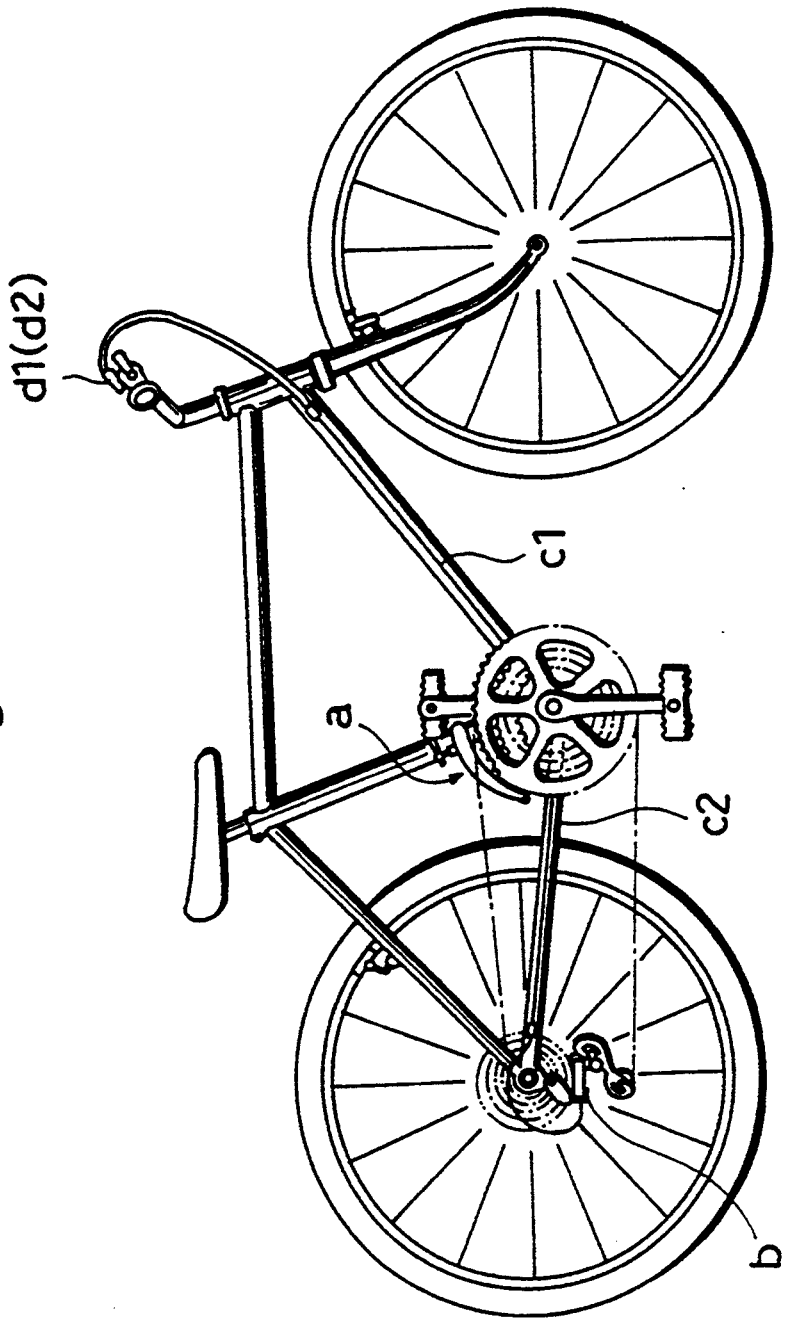

BICYCLE SPEED CHANGE SYSTEM, BICYCLE SPEED CHANGE METHOD AND BICYCLE SPEED CHANGE OPERATION ASSEMBLY

This application is a continuation of application Ser. No. 08/084,281, filed on Jul. 8, 1993, pending.

TITLE OF THE INVENTION

Bicycle Speed Change System, Bicycle Speed Change Method and Bicycle Speed Change Operation Assembly

1. Field of the Invention

The present invention relates to a bicycle speed change system, a bicycle speed change method and a bicycle speed change operation assembly, more specifically to those wherein a cylindrical member as a speed change operation member is rotatably supported around each grip end portion of a handlebar so that a speed change operation can be performed substantially without unhanding a handlebar and without erroneously shifting to a lower or higher speed.

2. Background Art

As shown in FIG. 10, a conventional speed change system for a bicycle provided with a front derailleur a and a rear derailleur b comprises a speed change operation assembly d1 for the front derailleur and another speed change operation assembly d2 for the rear derailleur. Each of the speed change operation assemblies is mounted at a suitable portion of a bicycle such as a handlebar and connected to a corresponding one of the derailleurs a, b by means of a corresponding control cable c1, c2. The derailleurs a, b are activated by operating the respective speed change operation assemblies d1, d2.

Each of the conventional speed change operation assemblies d1, d2 includes a lever having a base portion rotatably supported on a fixed shaft which is mounted on the bicycle frame or handlebar. The control cable c1, c2 is wound on the base portion of the lever. When the lever is turned in one direction, the control cable c1, c2 is wound further on a cable winding groove of the lever base portion. On the other hand, when the lever is turned in the opposite direction, the control cale c1, c2 is paid out from the winding groove under the tension applied by a return spring of the derailleur. The axial movement of the control cable is transmitted to the derailleur for actuation.

Such a derailler as shown in FIG. 10 (speed shifter of the external mounting type) is commonly used for laterally pressing a chain relative to a sprocket cluster which includes a plurality of diametrically different sprockets arranged side by side at a predetermined spacing, thereby performing a speed change by shifting the chain into engagement with a desired sprocket.

A rear derailleur, which is provided at the rear wheel, includes a chain guide which rotatably supports a guide pulley and a tension pulley, as disclosed in the Japanese Patent Application Laid-Open No. 63-251388 for example. The chain guide is rotatably supported, via a shift linkage mechanism such as a parallelogram pantograph mechanism, on a link base mounted on the bicycle frame while being urged in a chain tensioning direction. The shift linkage mechanism is deformed by operating a speed change lever assembly connected to the linkage mechanism via a control cable, thereby translating the chain guide, which is carried by a movable member of the shift linkage mechanism, axially of the hub shaft to shift the chain into engagement with a desired sprocket of a multiple freewheel for speed change.

On the other hand, a front derailleur includes a pair of inner and outer guide plates facing each other with the chain interposed therebetween. The pair of guide plates is moved laterally relative to a front gear, which includes a plurality of sprockets arranged side by side, for pressing the chain inward or outward into shifted engagement with a desired sprocket.

The conventional speed change operation assemblies described above are provided at a suitable portion of the handlebar or bicycle frame and may necessitate removing the hand from the handlebar at the time of performing a speed change. During the speed change operation, therefore, it becomes impossible to apply brake quickly, and steering of the bicycle is unavoidably instable since the bicycle must be steered by a single hand.

Meanwhile, a speed change operation is required usually when the road condition change, for instance, from flat to slope or vice versa. In such a case, the running condition tends to become unstable with greater needs for braking.

In order to solve this problem, Japanese Utility Model Laid-Open No. 58-26693 proposes a so-called rotary-grip type speed change operating assembly which comprises a cylindrical operation member is supported around each grip end portion of a handlebar. The cylindrical operation member is rotationally operated to pull or release a speed change control cable.

The speed change operation assembly described in the above-mentioned publication makes it possible to perform a speed change operation without unhanding the handlebar. The running safety can be greatly improved.

Conventionally, the rear derailleur is designed to move the chain guide laterally inward for bringing the chain into shifted engagement with a lower speed sprocket (larger sprocket) when the control cable is pulled. On the other hand, the front derailleur is designed to move the pair of guide plates laterally outward for bringing the chain into shifted engagement with a higher speed sprocket (larger sprocket) when the control cable is pulled.

Therefore, for simultaneously causing both of the front and rear derailleurs to perform a change to a lower speed, it is necessary to wind the rear derailleur control cable by the relevant speed change operation assembly while paying out the front derailleur control cable from the relevant speed change operation assembly. As a result, it is necessary to turn the respective speed change operation assemblies for the front and rear derailleurs in the opposite directions for simultaneously causing both of the front and rear derailleurs to perform a change to a lower or higher speed.

However, a serious problem arises if such rotary-grip type speed change operation assemblies as disclosed in the above Japanese publication are used in combination with both of the front and rear derailleurs of the bicycle.

Specifically, with the conventional speed change system, the front derailleur is designed to bring the chain into shifted engagement with a higher speed sprocket, namely a larger sprocket, when the control cable is pulled, as described previously. On the other hand, the rear derailleur is designed to bring the chain into shifted engagement with a lower speed sprocket, namely a larger sprocket, when the control cable is pulled. Thus, it is necessary to turn the respective speed change operation assemblies, namely the cylindrical operations members rotatably supported on the handlebar, in the opposite directions for equally causing both of the front and rear derailleurs to perform a change to a lower speed at an abrupt change of the road condition to a steep uphill for instance.

However, it is an extremely unnatural action for the rider to turn the two cylindrical operation members in the opposite directions under the situation where the road condition is changing. Apparently, the rider's both hands gripping the handlebar are subjected to equally directed forces, consequently making it difficult to turn only one of the cylindrical operation members in a direction against the force. As a result, the rider is likely to erroneously turn both of the cylindrical operation members in the same direction, thus failing to perform a quick change to a desired lower speed by causing one derailleur to shift to a higher speed position.

Especially, with mountain bikes designed for off-road riding, a failure in speed change to follow an abrupt change of the road condition can cause a bicycle overturn due to insufficient transmission of a pedalling force to the wheel.

DISCLOSURE OF THE INVENTION

It is, therefore, an object of the present invention to provide a bicycle speed change system and method wherein a speed change operation can be performed substantially without unhanding a handlebar and without erroneously shifting to a lower or higher speed.

Another object of the present invention is to provide a speed change operation assembly preferred for such a bicycle speed change system and method.

The present invention provides a bicycle speed change system which comprises a front speed shifter, a rear speed shifter, and speed change operation assemblies respectively including cylindrical operation members rotatably supported around right and left grip portions, respectively, of a handlebar, each of the shifters being operated by a control cable which is pulled or released by rotating a corresponding one of the cylindrical operation members, characterized in that:

each of the cylindrical operation members is designed so that rotation thereof in a direction of moving its top surface rearward causes a corresponding one of the shifters to shift to a lower speed position.

Other objects, features and advantages of the present invention will be clearly understood from the following description of a preferred embodiment given with reference to the accompanying drawings.

BRIEF DESCRIPTION OF THE DRAWINGS

FIG. 10 is a side view of a bicycle showing the entirety of a bicycle fitted with a conventional speed change system.

BEST MODE FOR CARRYING OUT THE INVENTION

An embodiment according to the present invention will now be described in more specific detail referring to FIGS. 1 to 9.

Figure 1:
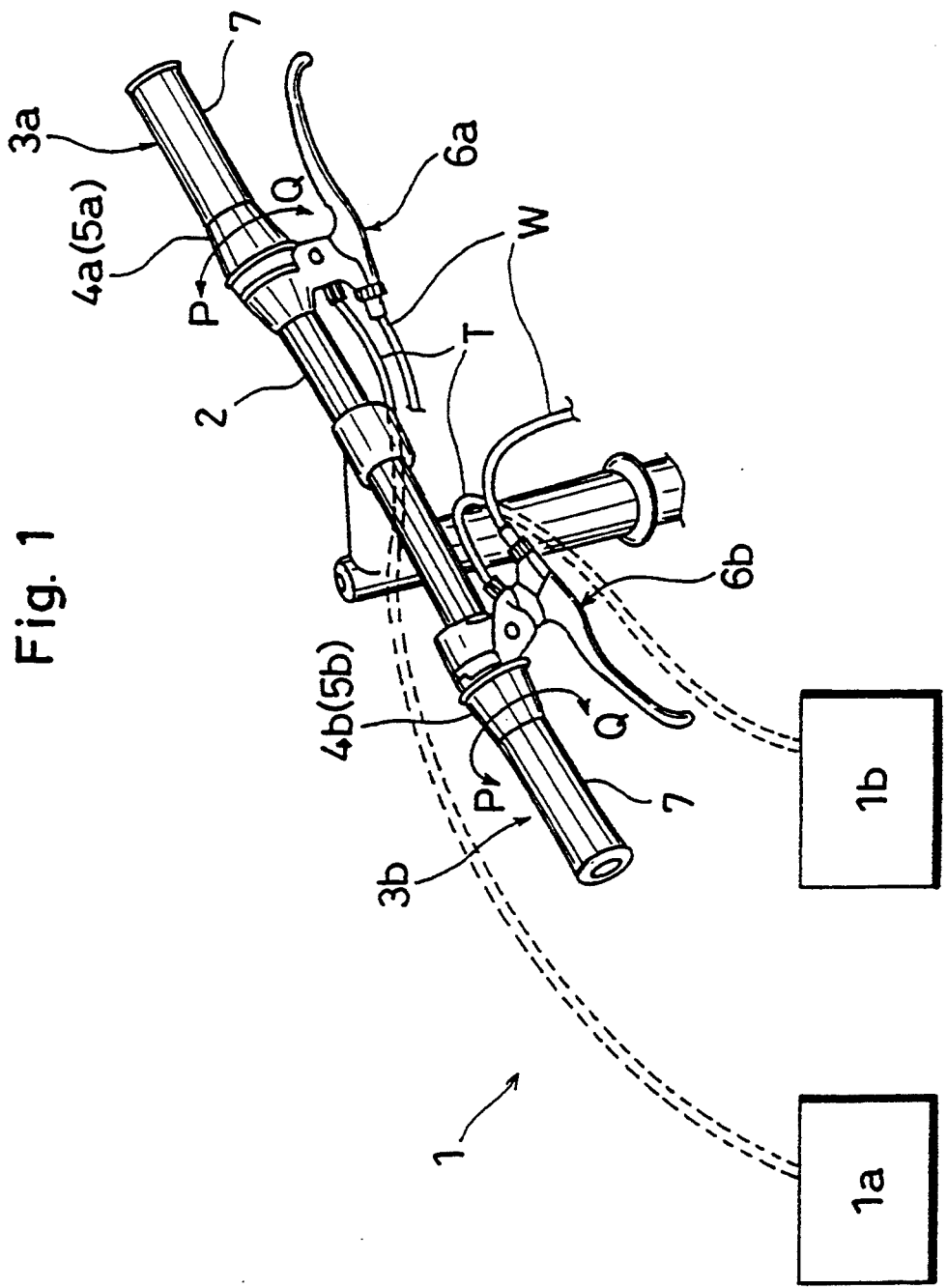
FIG. 1 is a view showing an overall arrangement of a bicycle speed change system according to the present invention.

As shown in FIG. 1, a speed change system 1 according to the present invention mainly comprises a front shifter or derailleur 1a, a rear shifter or derailleur 1b, and their respective speed change operation assemblies 5a, 5b, which respectively include a corresponding cylindrical operation member 4a, 4b functioning as a speed change operation member supported rotatably around a left or right grip end portion 3a, 3b of a handlebar 2.

The front derailleur 1 a according to the embodiment is arranged so that when an inner wire t1 of a control cable T further comprising an outer sheath t2 is pulled, a chain is shifted to a higher-speed or greater-diameter gear.

On the other hand, the rear derailleur 1b is arranged so that the chain is shifted to a lower-speed or greater-diameter gear when the inner cable t1 of the control cable T is pulled.

The front and rear derailleurs 1a, 1b are conventional derailleurs and will not be described here in detail.

Now, the following description will be made primarily for the right speed change operation assembly 5b for controlling the rear derailleur 1b. The left speed change operation assembly 5a for controlling the front derailleur 1a has basically the same constitution.

Figure 3:
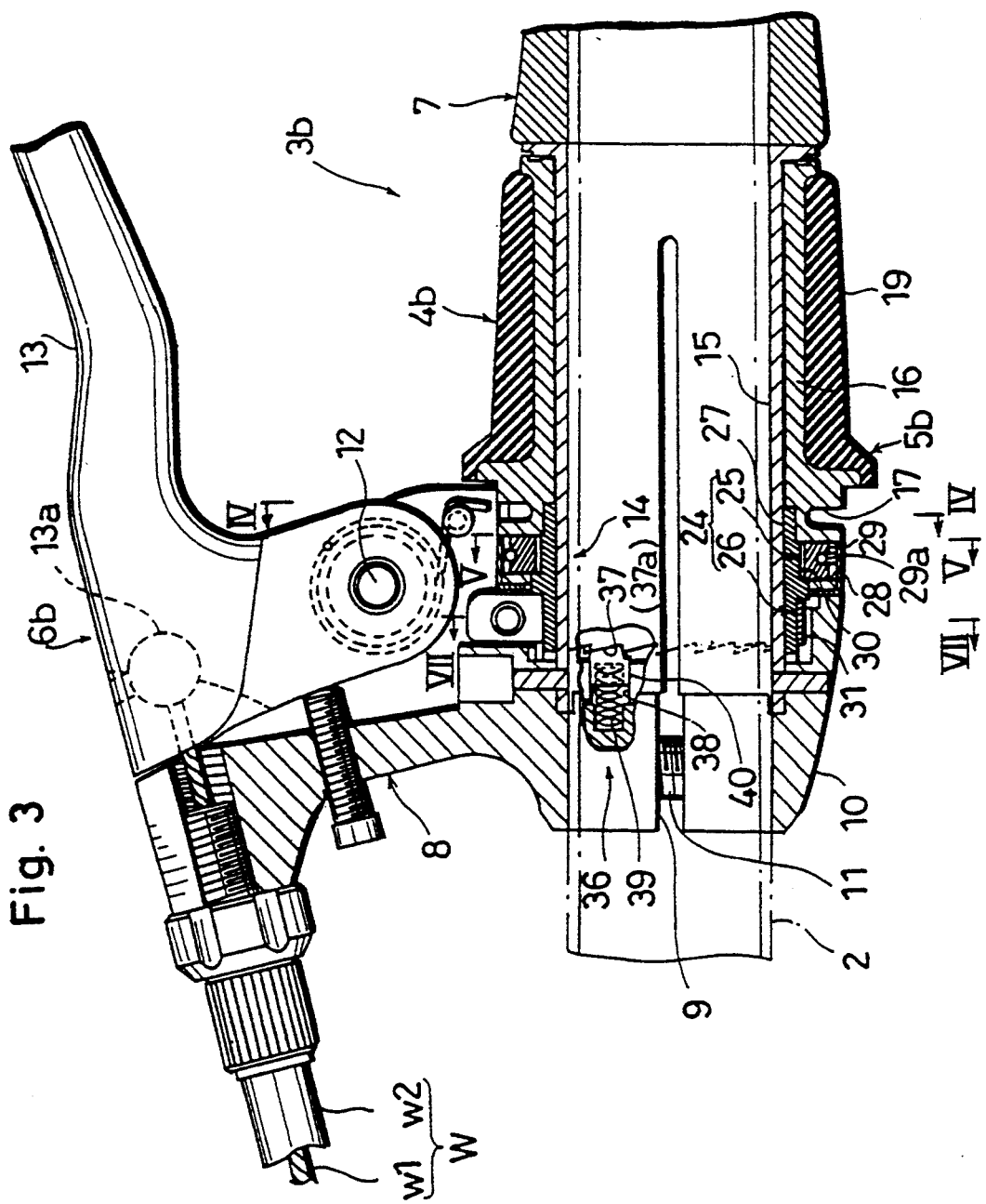
FIG. 3 is a longitudinal sectional view of the speed change operation assembly shown in FIG. 2.
Figure 4:
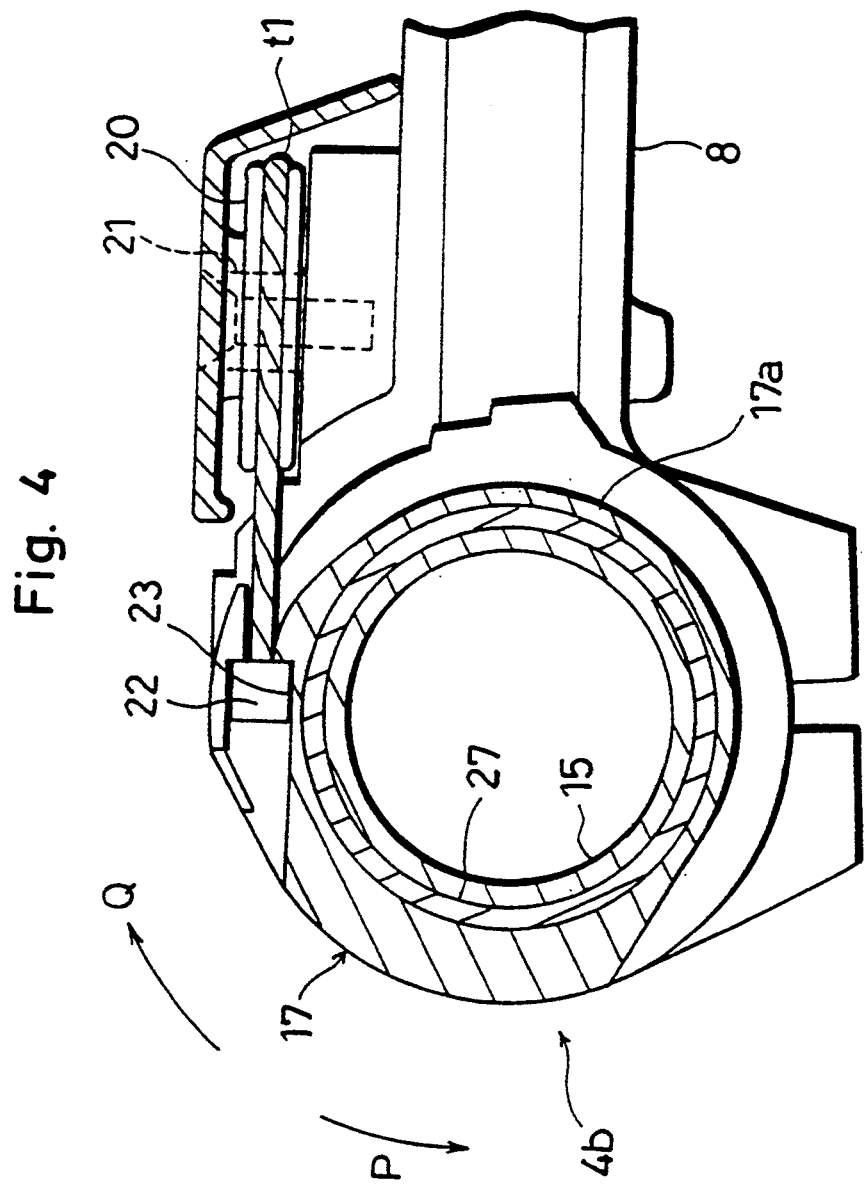
FIG. 4 is a sectional view taken on lines IV—IV in FIG. 3.

As shown in FIG. 3, the speed change operation assembly 5b according to the embodiment is integrated with a right brake lever assembly 6b and the right grip end portion 3b.

At a base end portion of a brake bracket 8 of the brake lever assembly 6b, there is provided a cylindrical mounting portion 10 formed with a slit 9 which is a longitudinal cut made to penetrate the circumferential wall of the bracket. This cylindrical mounting portion 10 is fitted on the handlebar 2 laterally inwardly of the grip end portion 3b. The slit 9 is traversed by a mounting screw 11 which causes the inner diameter of the cylindrical mounting portion 10 to shrink elastically, thereby fixing the brake bracket 8 and the speed change operation assembly 5b to the handlebar 2.

Figure 2:
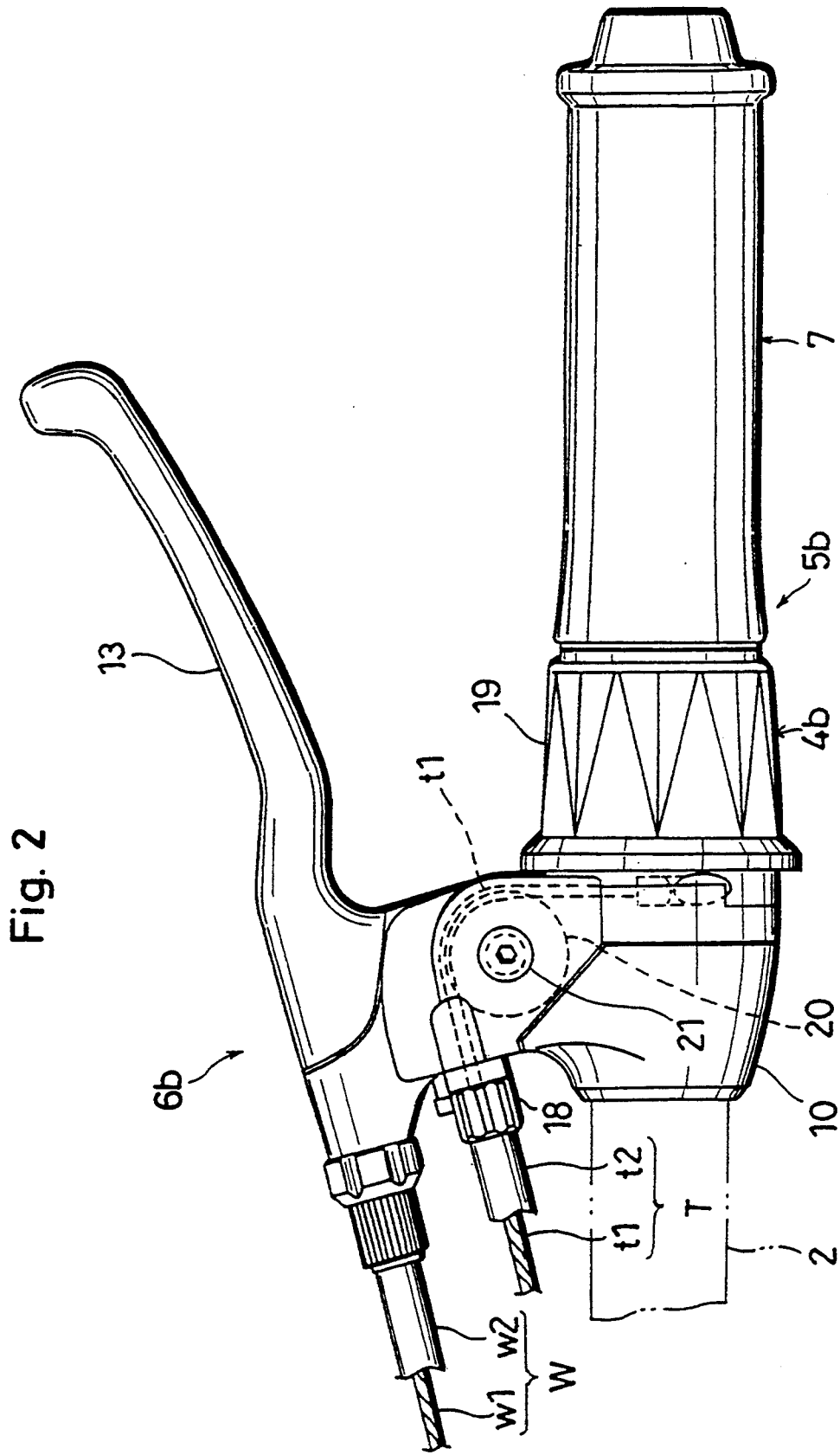
FIG. 2 is a plan view showing a right speed change operation assembly for controlling a rear speed shifter.

As shown in FIGS. 2 and B, the brake lever assembly 6b according to the embodiment has, in addition to the brake bracket 8 extending forwardly from a front face of the handlebar 2, a brake lever 13 pivotally connected at its base end portion to a lever shaft 12 provided on the brake bracket 8 and extending ahead of a handle grip 7. A brake cable W comprises an inner cable w1 and an outer sheath w2. The outer sheath w2 is connected to a laterally inner end portion of the brake bracket 8, whereas the inner cable w1 is introduced into an interior space of the brake bracket 8 and has an end nipple 13a connected to a base end portion of the brake lever 13.

The speed change operation assembly 5b according to the embodiment includes a cylindrical operation member 4b and a speed change operation mechanism 14. The cylindrical operation member 4b is rotatably supported laterally outwardly of the cylindrical mounting portion 10 fixed on the handlebar 2, namely around the right grip end portion 3b, to be continuous with a handle grip 7.

The speed change operation mechanism 12 is provided at the cylindrical operation member 4b and at the base end portion of the brake bracket 8.

The cylindrical operation member 4b according to the embodiment is rotatably supported around a cylindrical sleeve 15 which is fixed around the handlebar 2 axially outwardly of the base end portion of the brake bracket 8.

The cylindrical operation member 4b chiefly includes a control grip portion 16 for the rider to grip and turn, a reel portion 17 arranged laterally inwardly of the control grip portion 16 to wind the inner wire t1 of the control cable T, and a pawl housing 28 for accommodating a ratchet pawl 29 of a first ratchet mechanism 25 to be described later.

The control grip portion 16 is provided with a rubber coating 19 for the rider to grip conveniently, and the coating provides substantial continuity with the handle grip 7.

The cylindrical operation member 4b or the handle grip 7 can be gripped for steering while also enabling a speed change operation.

FIG. 2 is a plan view of the speed change operation assembly 5b according to the present embodiment. FIG. 3 is an enlarged longitudinal sectional view of the same speed change operation assembly 5b.

According to the embodiment, the outer sheath t2 of the control cable T is fastened to a fixing bolt 18 provided at the base end portion of the brake bracket 8. The inner wire t1 is passed on a direction changing reel 20 fixed to an upper wall of the base end portion of the brake bracket 8 for directional change before being wound around the reel winding portion 17 of the cylindrical operation member 4b.

As shown in FIGS. 2 and 2, the direction changing reel 20 is supported rotatably on a support shaft 21 which is provided on the upper wall of the base end portion of the brake bracket 8. The direction changing reel has the function of changing the running direction of the inner wire t1 of the control cable T. The inner wire extends toward the reel along the handlebar 2 and is then directed toward the outer circumference of the cylindrical operation member The inner wire t1 guided by the reel 20 for directional change has an end nipple 22 engaging in a nipple hole 23 provided at a wire winding groove 17a of the winding reel portion 17 of the cylindrical operation member 4b. As a result, the inner wire t1 is fixed to the cylindrical operation member 4b.

As shown in FIGS. 1 and 2, when the right cylindrical operation member 4b according to the embodiment is turned to cause its top surface to move rearward (in the direction indicated by Arrow P), the inner wire t1 of the control cable T is pulled. The other end of the inner cable t1 is connected to the rear derailleur.

Laterally inwardly of the cylindrical operation member 4b is provided a retainer mechanism 22 which regulates the turning movement of the cylindrical operation member 4b.

The first ratchet mechanism 25 is included in the retainer mechanism 22 according to the embodiment and functions to hold the cylindrical operation member 4b at a desired rotational position when the cylindrical operation member 4b pulls the inner wire t1.

The retainer mechanism also includes a resistance generating means 26 which imparts friction to prevent the inner wire t1 wound on the winding reel portion 17 of the cylindrical operation member 4b from being unexpectedly paid out under the tension applied by a return spring of the derailleur.

A ratchet wheel 27 as a constituent member of the first ratchet mechanism of the retainer mechanism 22 is provided axially inwardly of the cylindrical operation member 4b and around the sleeve 15, as shown in FIG. 3.

The ratchet wheel 27 has an engaging teeth portion 30 formed at a laterally outer portion of the rachet wheel outer circumference, and a resistance imparting portion 31 which gives a predetermined resistance against the cable releasing rotation of the cylindrical operation member 4b. The engaging teeth portion 30 engages the ratchet pawl 29 housed in the pawl housing 28 at the inner end of the cylindrical operation member 4b.

Figure 5:
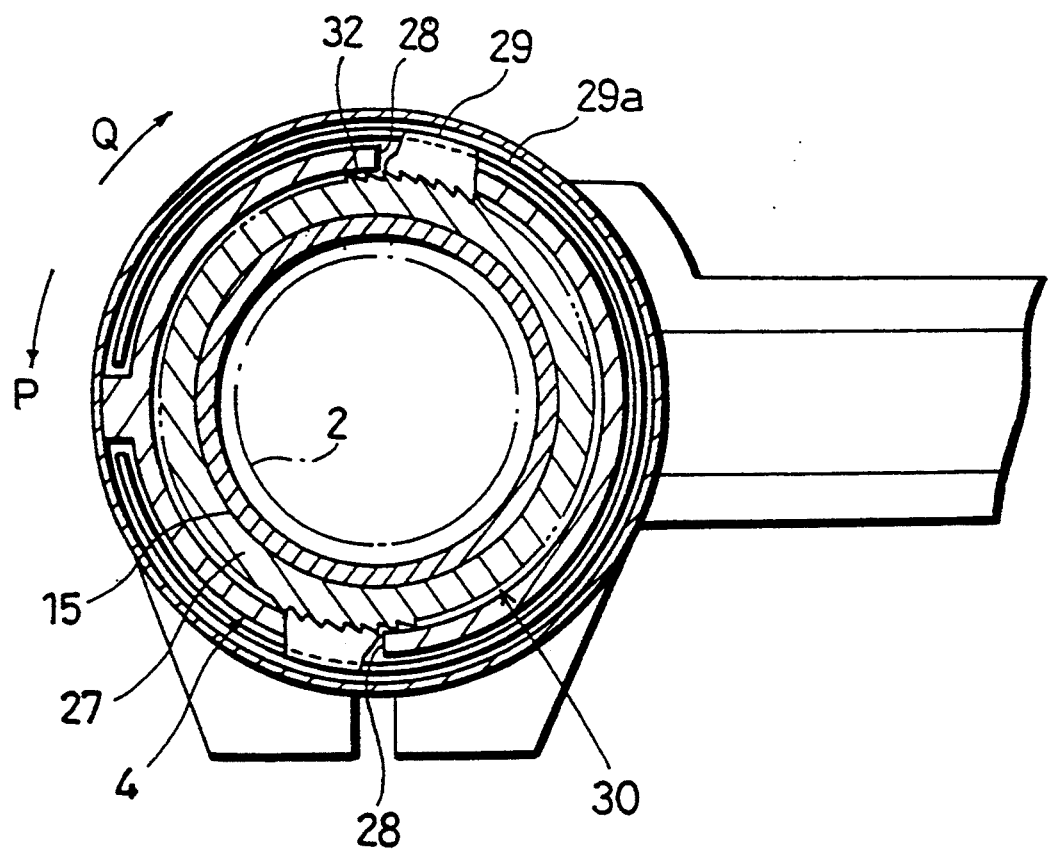
FIG. 5 is a sectional view taken on lines V—V in FIG. 3.

As shown in FIG. 5, the engaging teeth portion 30 of the ratchet wheel 27 is formed with one-way sloping engaging teeth 32.

Figure 6:
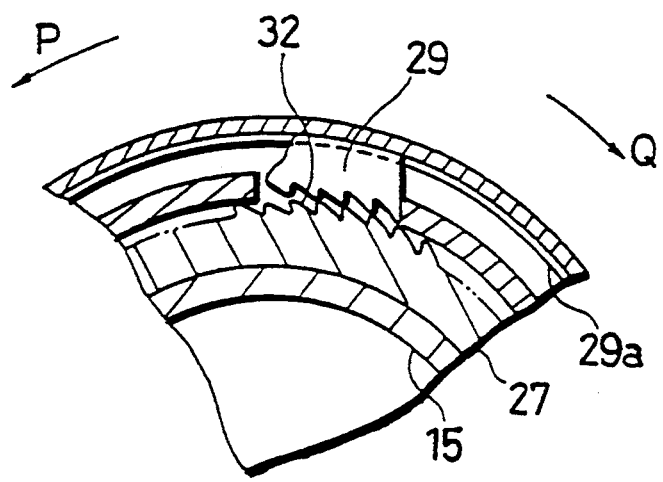
FIG. 6 is a view showing the operation of a first ratchet mechanism shown in FIG. 5.

As shown in FIG. 6, when the cylindrical operation member 4b is turned in the cable winding direction (Arrow P), the ratchet pawl 29 housed in the pawl housing 28 of the cylindrical operation member 4b is lifted radially outward to allow relative movement between the ratchet wheel 27 and the cylindrical operation member 4b. On the other hand, when the cylindrical operation member 4b is turned in the cable releasing direction (Arrow Q), a ring spring 29a elastically urges the ratchet pawl 29 radially inward into engagement with the engaging teeth 32 of the ratchet wheel 27, so that the cylindrical operation member 4b turns integrally with the ratchet wheel 27, as shown in FIG. 5.

Figure 7:
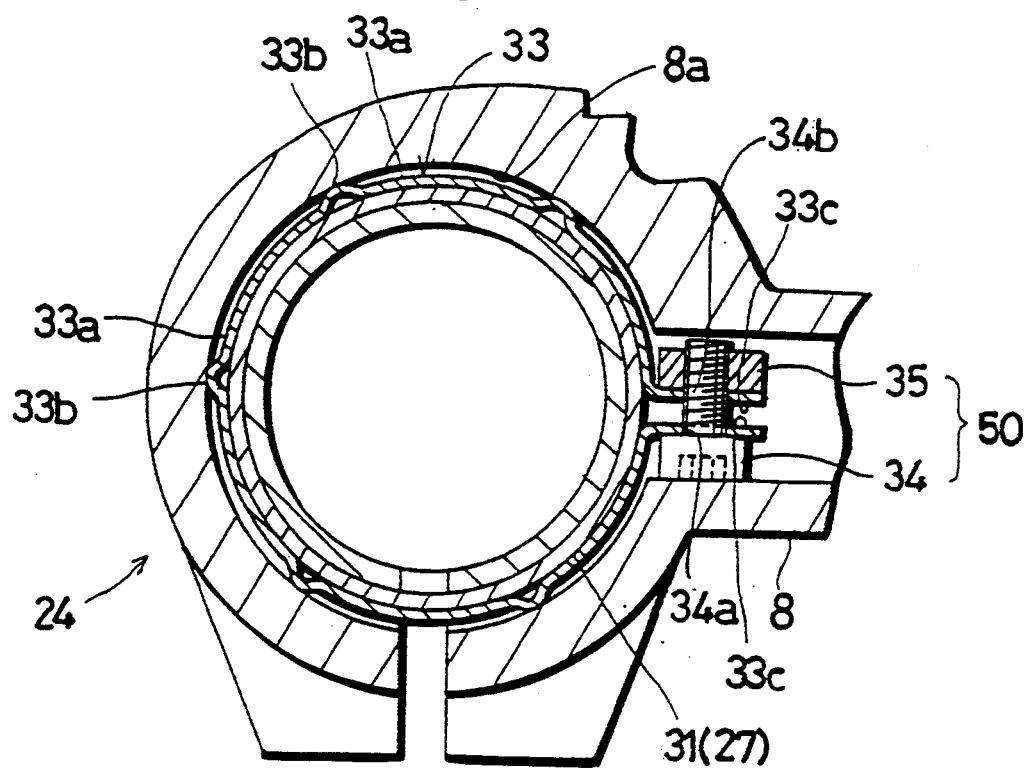
FIG. 7 is a sectional view taken along lines VII—VII in FIG.

As shown in FIGS. 3 and 7, a ring-form friction band 33 is fitted on the resistance imparting portion 31 of the ratchet wheel 27 to give a predetermined rotational resistance to the ratchet wheel 27. The end portions of the friction band 33 are brought closer to each other by a tightening means 50 which includes a tightening bolt 32 and a tightening nut 35, thereby creating the predetermined rotational resistance for the ratchet wheel by causing the friction band to compressively fit on the outer circumferential surface of the resistance imparting portion 31.

As shown in FIG. 7, the friction band 33 of the embodiment, which is made by pressing a plate spring material into an annular form, has a plurality of arcuate contact portions 33a in slidable contact with the outer circumferential surface of the resistance imparting portion B1. The friction band also includes a plurality of integral joint portions 33b formed between the respective contact portions 33a and bulging radially outward so as not to touch the outer circumferential surface of the resistance imparting portion 31, and a parallel pair of tightening portions 33c extending radially outward from the end portions of the band to be brought closer to each other by the tightening means 50.

Each of the contact portions 33a has an arcuate inner surface corresponding to the outer circumferential surface of the resistance imparting portion 31. Each of the joint portions 33b is larger in curvature than the contact portion 33a to bulge radially outward as spaced from the outer circumferential surface of the resistance imparting portion 31.

Each of the tightening portions 33c is formed with a perforation 32a, 32b through which the tightening bolt 32 of the tightening means 50 is inserted. The tightening bolt 32 is screwed into the tightening nut 35 to bring the pair of tightening portions 33c closer to each other.

The tightening portions 33c extend into the interior space of the base end portion of the brake bracket 8. The tightening portions 33c or the tightening bolt 32 penetrating them contacts the walls of the interior space, thereby preventing the friction band from turning with the ratchet wheel 27.

Friction is generated between the inner surfaces of the arcuate contact portions 33a and the outer circumferential surface of the resistance imparting portion 31. As a result, the friction band imparts the predetermined resistance to the ratchet wheel 27 which is turned with the cylindrical operation member The distance between the pair of tightening portions 33c can be adjusted by means of the tightening bolt 32 and the tightening nut 35. It is thus possible to adjust the tightening force imparted to the resistance imparting portion 31 by the contact portions 33a, thereby setting the rotational resistance to the ratchet wheel at a predetermined value.

The rotational resistance described above should be set, by adjusting the tightening force provided by the tightening bolt 35 and the tightening nut 35, to overcome the tension applied to the inner wire t1 by the return spring of the rear derailleur The use of the retainer mechanism 22 incorporating the resistance generating means 26 of the above-described structure insures smooth operation of the speed change system 1 according to the present invention.

More specifically, the respective contact portions 33a of the friction band 33 can easily deform elastically due to the presence of the joint portions 33b acting as node points, enabling the friction band to have a greater spring elasticity than was conventionally possible with a simply annular friction member. As a result, the friction band 33 can be made to accumulate an elastic energy over the entire circumference thereof when the pair of tightening portions 33c are brought closer to each other by the tightening bolt 32. This means that the tightening portions 33c tightened by the tightening bolt 32 and the tightening nut 35 can be made to have a greater range for adjustment, thereby greatly increasing the adjustable range of the rotational resistance for the cylindrical operation member in addition to enabling a fine adjustment.

Further, the joint portions 33b acting as node points also enable the contact portions 33a to come into uniform pressing contact with the outer circumferential surface of the ratchet wheel 27. Thus, the rotational resistance imparted to the ratchet wheel 27 can be stabilized and optimized, consequently improving the rotational operability of the cylindrical operation member.

Further, the tightening bolt 34 for bringing the tightening portions 33c closer to each other can be arranged perpendicularly to the axis of the friction band 33, so that the presence of the tightening bolt will not add to the axial dimension of the speed change operation assembly. Moreover, the use of the friction band, which is made to slidably fit around the outer circumferential surface of the ratchet wheel 27, best suits the speed change operation assembly of the embodiment wherein the cylindrical operation member 4b is supported on the handlebar.

Further, as shown in FIG. 7, gaps are formed between the joint portions 37b and the outer circumferential surface of the resistance imparting portion 31. These gaps can be used for retaining grease to prevent wear between the friction band 33 and the resistance imparting portion 31 over a long period, thus enabling to maintain the performance of the speed change operation assembly over a long period.

According to the present embodiment, provision is made of a second ratchet mechanism 36 including an engaging member 20 which is axially movable into and out of engagement with the inner end of the ratchet wheel 27, as shown in FIG. 3.

The second ratchet mechanism 36 includes a teeth portion 37 formed at the inner end surface of the ratchet wheel 27, and a spring 39 housed in a pawl housing hole 38 which is formed in the base end portion of the brake bracket 8. The engaging member 40 is elastically urged by the spring 39.

The teeth portion 37 is formed with engaging teeth 37a which are opposite in orientation to the engaging teeth 32 of the engaging teeth portion 30 of the first ratchet mechanism.

When the cylindrical operation member 4b is turned in the cable releasing direction, the engaging member 20 of the second ratchet mechanism 36 repetitively comes into and out of engagement with the teeth portion while generating ratcheting sounds. As a result, the rider can clearly confirm the completion of a speed change operation.

The speed change operation assembly 5b of the above-described arrangement will now be described with respect to its function.

When the right cylindrical operation member 4b is turned so as to cause its top surface to move rearward (the direction of Arrow P in FIG. 1), the inner wire t1 is pulled by being wound on the-reel portion 17.

At this time, the ratchet pawl 29 held at the axially inner ended of the cylindrical operation member 4b is lifted outward radially of the ratchet wheel 27 against the elastic force of the ring spring 29a, as shown in FIG. 6. The ratchet pawl slidably moves relative to the engaging teeth portion 30, so that the resistance imparting portion 31 imparts no rotational resistance to the cylindrical operation member 4b.

On the other hand, the ratchet pawl 29 repetitively comes into and out of engagement with the engaging teeth 32 of the ratchet wheel 27 while generating ratcheting sounds in corresponding relation to the teeth intervals. As a result, the rider can clearly confirm that a desired speed change operation is being performed while also recognizing the extent to which the cylindrical operation member has been turned.

When the rotation of the cylindrical operation member 4b is stopped at a desired rotational position, the tension of the inner wire t1 given by the return spring of the rear derailleur 1b combined with the elastic force of the ring spring 29a causes the ratchet pawl 29 to engage the engaging teeth portion 30 with the result that the cylindrical operation member 4b tends to rotate integrally with the ratchet wheel 27, as shown in FIG. 5. However, such rotation is prevented by the friction generated by the friction band 33 fitted on the resistance imparting portion 31 of the ratchet wheel 27. Therefore, the inner wire t1 is retained at a pulled position corresponding to the rotational position of the cylindrical operation member 4b, so that the inner wire t1 is prevented from being paid out unexpectedly from a desired position.

Conversely, when the cylindrical operation member 4b is turned so as to cause its top surface to move forward (in the direction of Arrow Q), the ratchet pawl 29 is held in engagement with the engaging teeth portion 30 to cause the cylindrical operation member 4b to rotate with the ratchet wheel 27. At this time, though the friction band 33 wound on the resistance imparting portion 31 generates a rotational resistance, the force needed to turn the cylindrical operation member 4b can be rendered only equal to an amount obtained by subtracting the tension of the inner wire t1 from the rotational resistance of the friction band 33. As a result, the inner wire t1 can be paid out easily with a reduced rotational force.

With the arrangement described above, the rotational operation of the cylindrical operation member 4b causes the inner wire t1 to be wound up or paid out for performing a speed change. Because of the rotational resistance given by the friction band 33, the cylindrical operation member 4b is prevented from turning under the tension of the inner wire t1 applied by the return spring of the rear derailleur 1b, and the inner wire t1 is thereby prevented from being accidentally paid out.

Further, according to the embodiment, since the second ratchet mechanism 36 is constituted by the teeth portion 37 at the end surface of the ratchet wheel 27 and by the engaging member 20 housed in the pawl housing hole 38 at the base end portion of the brake bracket, ratcheting sounds are also generated when the inner wire t1 is paid out. Therefore, if the teeth interval of the teeth portion 37 is set to correspond to the interval between the speed stages, a ratcheting sound can be given at each of the speed stages. As a result, the rider can perform a speed change operation very reliably with the help of the ratcheting sound even when turning the cylindrical operation member 4b in the cable releasing direction.

The embodiment has so far been described only with respect to the speed change operation assembly 5b which is mounted at the right hand side of the handlebar 2 to control the rear derailleur 1b. Obviously, the speed change operation assembly 5a mounted at the left hand side of the handlebar 2 to control the front deraillur 1a employs exactly the same arrangement except for the following points.

Figure 8:
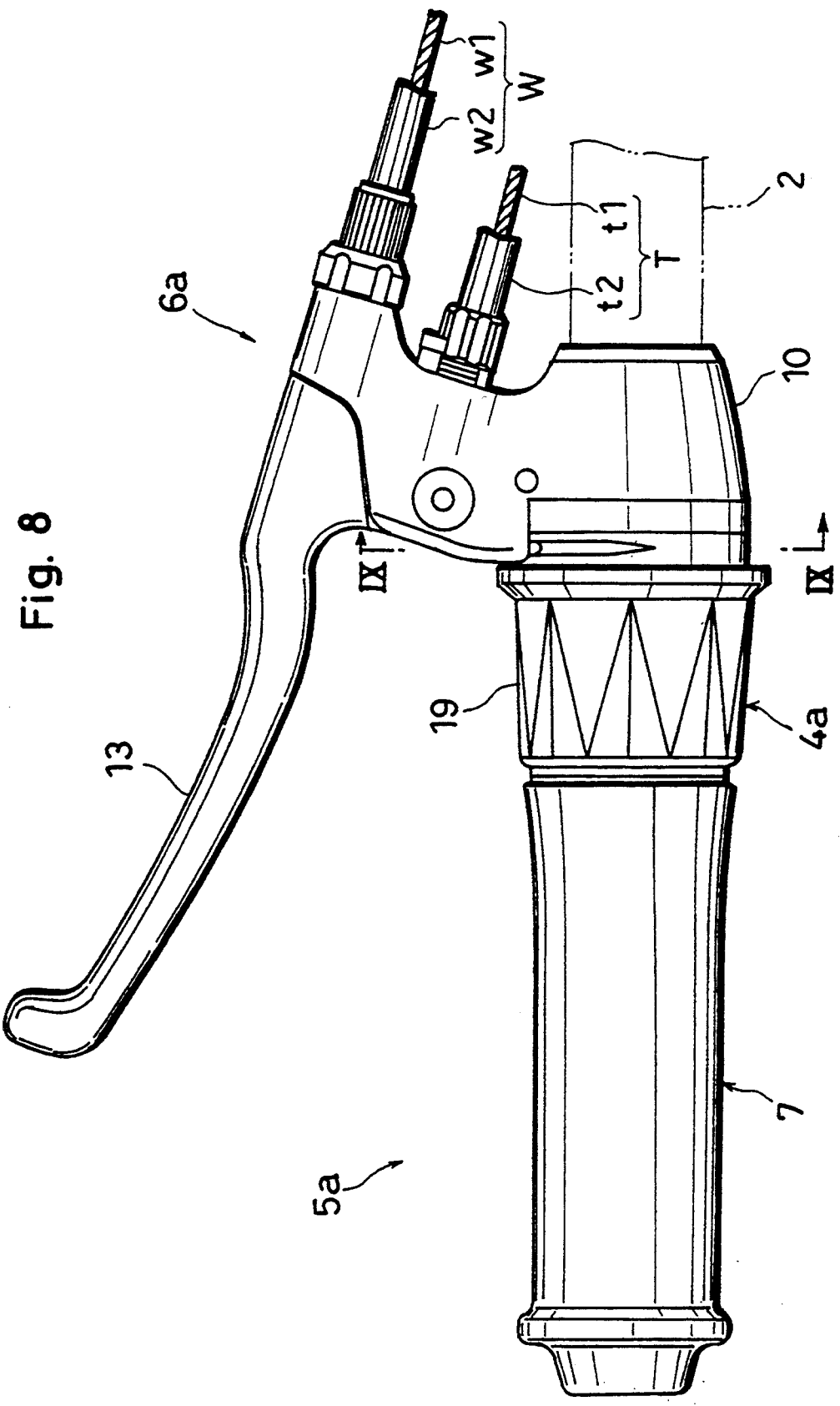
FIG. 8 is a plan view showing a left speed change operation assembly for controlling a front speed shifter.
Figure 9:
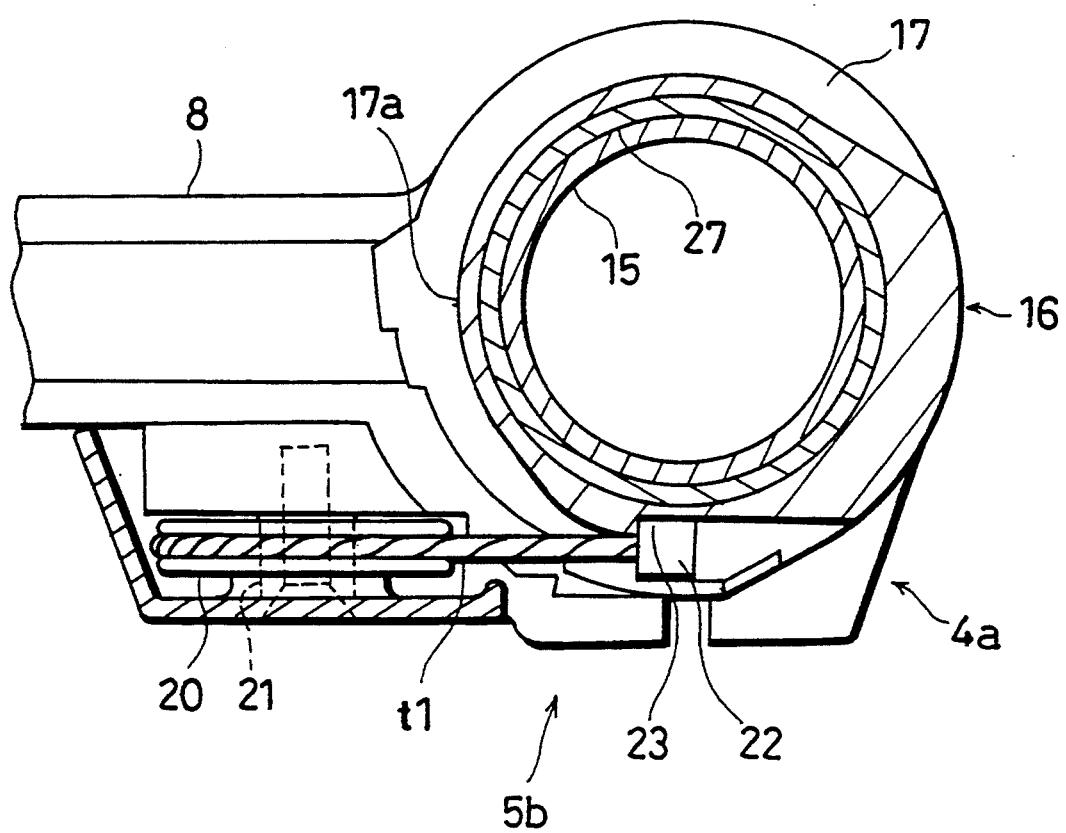
FIG. 9 is a sectional view taken on lines IX—IX in FIG. 8.

Specifically, as shown in FIGS. 8 and 9, the reel 20 of the left speed change operation assembly 5a is provided on a bottom wall of the brake bracket 8 for pulling and paying out the inner wire t1 under the handlebar 2.

Thus, when the cylindrical operation member 4a of the left speed change operation assembly 5a is turned so as to cause its top surface to move rearward (the direction of Arrow P), the inner wire t1 is paid out. The opposite rotation (the direction of Arrow Q) results in that the inner wire t1 is pulled.

Though not shown in the drawings, the ratchet pawl for the ratchet wheel 27 is oriented oppositely to that for the right ratchet wheel.

With the speed change system 1 according to the embodiment, when the right and left cylindrical operation members 4a, 4b are turned so as to cause their respective top surfaces to move rearward (the direction of Arrow P), the inner wire t1 for the right speed change operation assembly 5b is pulled, whereas the inner wire t1 for the left speed change operation assembly 5a is paid out.

In addition, the control cable T extending from the right speed change operation assembly 5b is connected to the rear derailleur 1b, whereas the left control cable T is connected to the front derailleur 1a.

Therefore, when the respective cylindrical operation members 4a, 4b are turned rearward (the direction of Arrow P), both of the front and rear derailleurs 1a and 1b are shifted to a lower speed position. Conversely, when the respective cylindrical operation members are turned in the opposite direction (the direction of Arrow Q), both of the derailleurs are shifted to a higher speed position.

Such an arrangement eliminates the need for turning the right and left cylindrical operation members in the mutually opposite directions at the time of simultaneously causing both derailleurs to shift to a lower speed position, as opposed to the conventional speed change system of the rotary grip type. Thus, it is possible to reduce the chance of moving one derailleur to a lower speed position while moving the other derailleur to a higher speed position rotating, by erroneously rotating both cylindrical operation members in the same direction at the time of an emergency.

According to the embodiment, both derailleurs 1a, 1b are moved to a lower speed positions when the respective cylindrical operation members 4a, 4b are equally turned rearward (the direction of Arrow P).

One of the cases where both derailleurs 1a, 1b need be shifted at the same time to a lower speed position may be when the bicycle begins to climb a steep uphill slope. In such a case, the rider is generally required to pull the handlebar toward himself/herself for stabilizing the steering operation and for increasing the pedalling force. At this time, the rider inherently tends to pull the handlebar toward himself/herself, causing the grip portions 3a, 3b to turn rearward.

According to the embodiment, the force inherently acting on the grip portions 3a, 3b is utilized for smoothly performing a speed change operation. Indeed, the speed change operation does not interfere with the dynamics of the rider's hands and arms.

In this way, it is possible to perform a speed change operation smoothly and reliably, thereby assuring comfortable riding. Further, an erroneous operation of the derailleurs can be effectively prevented to improve the riding safety.

The scope of the present invention is not limited to the above-described embodiment.

In the embodiment, each of the inner wires is guided by the reel 20 for directional change before winding around the corresponding cylindrical operation member La, Lb. However, the wire may be wound directly around the cylindrical operation member 4a, 4b.

According to the embodiment, the first ratchet mechanism 25 and the second ratchet mechanism 36 are provided as retaining means. However, the retaining means may include a friction generating mechanism alone. Further, the present invention is also applicable to a speed change system which uses a click mechanism as retaining means.

While the retainer mechanism 24 according to the embodiment is applied to the speed change operation system incorporating the cylindrical operation member 4b, it is also applicable independently for example to a speed change operation system which comprises a speed change lever rotatably supported on a lever shaft arranged at a suitable portion of a bicycle frame.

Still further, the present invention may be applied not only to speed change systems of the external mounting type such as front and rear derailleurs but also to other types of speed change systems including those of the internal mounting type.

In the second ratchet mechanism employed in the speed change operation assembly according to the embodiment, the teeth portion 37 is formed at the inner end of the ratchet wheel 27, whereas the engaging member 40 is held at the base end portion of the brake bracket. However, the teeth portion may be formed on the brake bracket, whereas the engaging member may be retained by the rachet wheel 27.

Similarly to the ratainer mechanism, the second ratchet mechanism, which is applied to the speed change operation system incorporating the cylindrical operation member 4b according to the embodiment, is also applicable independently for example to a speed change operation system which comprises a speed change lever rotatably supported on a lever shaft arranged at a suitable portion of a bicycle frame.

We claim:

1. A bicycle speed change operation assembly comprising:
    a cylindrical operation member rotatably supported coaxially around a grip end portion of a handlebar;
    a winding reel arranged coaxially around the grip end portion for rotation with the cylindrical operation member;
    cable means connected to the winding reel and a speed shifter, the cable means being pulled or paid out by the winding reel for operating the speed shifter in response to the rotation of the cylindrical operation member; and
    a direction changing reel that is supported for rotation about a support shaft extending perpendicularly to the handlebar for directing the cable means, which approaches the direction changing reel in a direction along the handlebar, transversely toward the handlebar for connection to the winding reel.

2. The bicycle speed change operation assembly according to claim 1, wherein the support shaft of the direction changing reel is fixed to a brake bracket of a brake lever assembly.

3. The bicycle speed change operation assembly according to claim 1, wherein the winding reel is positioned at an axially inner end of the cylindrical operation member.

4. A combination of a bicycle brake lever assembly and a bicycle speed change operation assembly, the brake lever assembly comprising: a brake bracket having a cylindrical mounting portion fixed around a handlebar adjacent to a grip end portion thereof; and a brake lever pivotally connected to the brake bracket; wherein the speed change operation assembly comprises:
    a cylindrical sleeve fixed coaxially around the grip end portion of the handlebar and extending into the cylindrical mounting portion of the brake bracket;
    a cylindrical operation member rotatably supported coaxially around the cylindrical sleeve;
    a winding reel arranged coaxially around the cylindrical sleeve at an axially inner end of the cylindrical operation member for rotation therewith;
    cable means connected to the winding reel and a speed shifter, the cable means being pulled or paid out by the winding reel for operation the speed shifter in response to the rotation of the cylindrical operation member; and
    a retainer mechanism arranged coaxially around the cylindrical sleeve and in the cylindrical mounting portion of the brake bracket for rotationally retaining the winding reel against a tension applied to the cable means.

* * * * *

UNITED STATES PATENT AND TRADEMARK OFFICE
CERTIFICATE OF CORRECTION

PATENT NO.  : 5,390,565
DATED       : February 21, 1995
INVENTOR(S) : Koichi Tagawa, et al It is certified that error appears in the above-indentified patent and that said Letters Patent is hereby corrected as shown below:

On the title page, under item [30], add the following information
    --PCT/JP92/01454    11/9/92--

Signed and Sealed this

Sixteenth Day of May, 1995

*Attest:*

BRUCE LEHMAN

*Attesting Officer*   *Commissioner of Patents and Trademarks*